(12) United States Patent
Imamura et al.

(10) Patent No.: US 12,036,714 B2
(45) Date of Patent: Jul. 16, 2024

(54) MOLDING MATERIAL AND TUBE

(71) Applicant: DAIKIN INDUSTRIES, LTD., Osaka (JP)

(72) Inventors: Hitoshi Imamura, Osaka (JP); Hiroyuki Hamada, Osaka (JP); Eri Mukai, Osaka (JP); Masahiro Kondo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 273 days.

(21) Appl. No.: 17/041,669

(22) PCT Filed: Feb. 22, 2019

(86) PCT No.: PCT/JP2019/006851
§ 371 (c)(1),
(2) Date: Sep. 25, 2020

(87) PCT Pub. No.: WO2019/187859
PCT Pub. Date: Oct. 3, 2019

(65) Prior Publication Data
US 2021/0008775 A1    Jan. 14, 2021

(30) Foreign Application Priority Data

Mar. 27, 2018  (JP) ................... 2018-059476

(51) Int. Cl.
| B29C 48/00 | (2019.01) |
| B29C 48/04 | (2019.01) |
| B29K 27/18 | (2006.01) |
| B65D 35/08 | (2006.01) |
| C08F 8/20 | (2006.01) |
| C08F 214/26 | (2006.01) |
| C08F 214/28 | (2006.01) |
| F16L 11/04 | (2006.01) |
| C08F 216/14 | (2006.01) |

(52) U.S. Cl.
CPC ............ B29C 48/022 (2019.02); B29C 48/04 (2019.02); B65D 35/08 (2013.01); C08F 8/20 (2013.01); F16L 11/04 (2013.01); B29K 2027/18 (2013.01); C08F 214/262 (2013.01); C08F 214/28 (2013.01); C08F 216/1408 (2013.01)

(58) Field of Classification Search
None
See application file for complete search history.

(56) References Cited

U.S. PATENT DOCUMENTS

| 5,546,182 | A | 8/1996 | Sota |
| 6,515,064 | B1 | 2/2003 | Tanaka et al. |
| 6,541,588 | B1 | 4/2003 | Kaulbach et al. |
| 6,663,722 | B1 | 12/2003 | Higashino et al. |
| 6,693,164 | B2* | 2/2004 | Blong ................. C08F 6/06 525/487 |
| 6,703,461 | B1 | 3/2004 | Tanaka et al. |
| RE40,902 | E | 9/2009 | Kaulbach et al. |
| 2003/0130459 | A1 | 7/2003 | Kaulbach et al. |
| 2004/0147698 | A1 | 7/2004 | Tanaka et al. |
| 2004/0232584 | A1* | 11/2004 | Johnson ............... B29C 48/625 134/26 |
| 2005/0107535 | A1 | 5/2005 | Funaki et al. |
| 2006/0235157 | A1* | 10/2006 | Kanega .................. C08F 6/22 525/199 |
| 2007/0130794 | A1 | 6/2007 | Kawase |
| 2009/0044965 | A1 | 2/2009 | Kono et al. |

FOREIGN PATENT DOCUMENTS

| DE | 199 03 657 A1 | 8/2000 |
| EP | 0 606 492 A1 | 7/1994 |
| EP | 1 097 948 A1 | 5/2001 |
| EP | 1 162 212 A1 | 12/2001 |
| JP | 2000-001518 A | 1/2000 |
| JP | 2000-159948 A | 6/2000 |
| JP | 2002-127137 A | 5/2002 |
| JP | 3439478 B2 | 8/2003 |
| JP | 2007-83594 A | 4/2007 |
| JP | 2007-160581 A | 6/2007 |
| JP | 4001418 B2 | 10/2007 |
| JP | 2008-144180 A | 6/2008 |
| JP | 2012-57172 A | 3/2012 |
| JP | 2012-86392 A | 5/2012 |
| JP | 2012-224031 A | 11/2012 |
| JP | 2019006983 A * | 1/2019 ......... B29C 45/0001 |
| TW | 462972 B | 11/2001 |
| WO | 94/28394 A1 | 12/1994 |
| WO | 99/49997 A1 | 10/1999 |
| WO | 00/42093 A1 | 7/2000 |
| WO | 2006/123694 A1 | 11/2006 |
| WO | 2006/127218 A1 | 11/2006 |

OTHER PUBLICATIONS

International Search Report for PCT/JP2019/006851 dated, Apr. 9, 2019 (PCT/ISA/210).
Extended European Search Report dated Nov. 26, 2021 in European Application No. 19777237.9.
International Preliminary Report on Patentability with Translation of Written Opinion of the International Searching Authority dated Sep. 29, 2020 in International Application No. PCT/JP2019/006851.
Communication dated Aug. 23, 2022, issued in Chinese Application No. 201980020701.2.
Research and Development of Fluorine-containing Materials, Jun. 30, 2003, Editor-in-Chief Bian Zhengxian and others East China University of Science and Technology Press, Research and Development of Fluorine-containing Materials, 2003, 4 pages total.

* cited by examiner

*Primary Examiner* — Nicole M. Buie-Hatcher
(74) *Attorney, Agent, or Firm* — Sughrue Mion, PLLC

(57) ABSTRACT

A molding material including a melt-fabricable fluororesin and having a metal content of 100 ng/1 g or less as measured by an ashing method. Also disclosed is a tube made of the molding material.

3 Claims, 1 Drawing Sheet

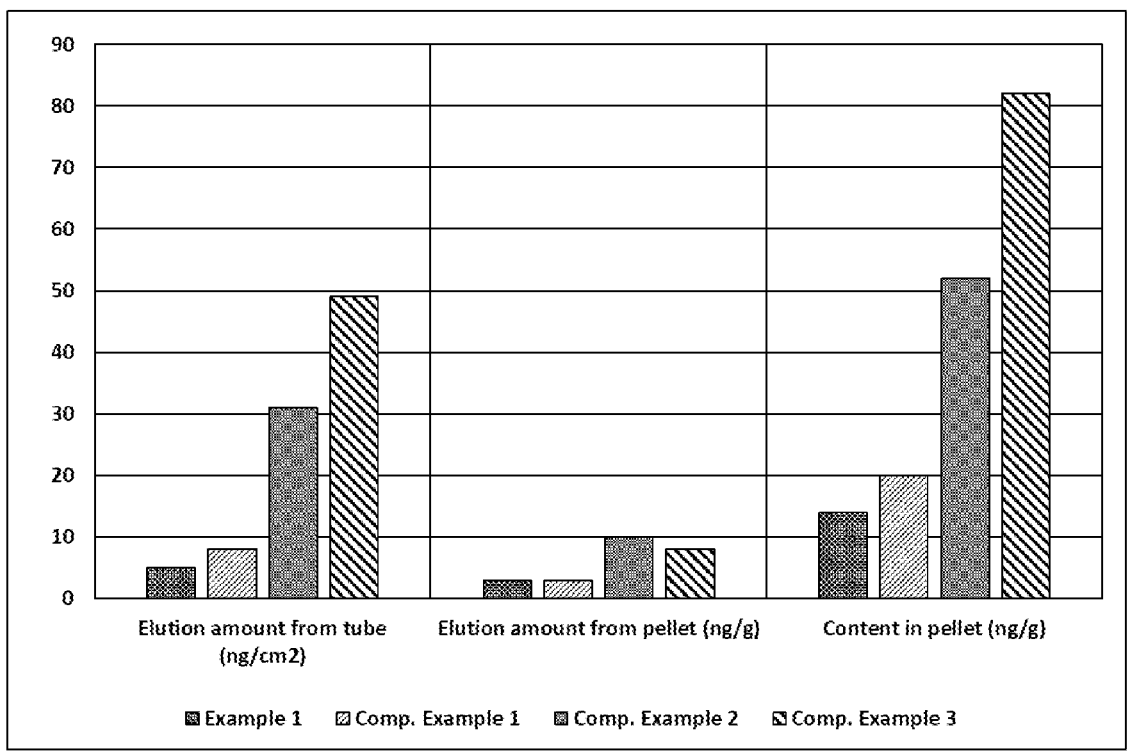

MOLDING MATERIAL AND TUBE

CROSS REFERENCE TO RELATED APPLICATIONS

This application is a National Stage of International Application No. PCT/JP2019/006851 filed Feb. 22, 2019, claiming priority based on Japanese Patent Application No. 2018-059476 filed Mar. 27, 2018.

TECHNICAL FIELD

The present disclosure relates to a molding material and a tube.

BACKGROUND ART

Patent Document 1 suggests a molding material consisting of a fluorine-containing copolymer, which has a metal elution index η of at most 10 (where the metal elution index η is the total amount in nanogram of specific metal components eluted per 1 g of the fluorine-containing copolymer, as defined in the description), as a molding material that can provide a molded article with less color by melt-molding.

RELATED ART

Patent Documents

Patent Document 1: JP2000-1518A

SUMMARY OF THE INVENTION

Fluororesins are used as a molding material of, for example, a tube for transferring a chemical liquid for use in production of semiconductor devices. With micronization of semiconductor devices of late years, these is a need for a technique for reducing an adverse influence of metal components in a molding material containing a fluororesin to an unprecedented level.

The object of the present disclosure is to provide a molding material containing a fluororesin with a reduced amount of metal components.

Means for Solving the Problem

The present disclosure provides a molding material comprising a melt-fabricable fluororesin and having a metal content of 100 ng/1 g or less as measured by an ashing method.

Preferably, the fluororesin has a melt flow rate of 1 to 6 g/10 min.

Preferably, the fluororesin is a copolymer containing a tetrafluoroethylene unit and at least one monomer unit selected from the group consisting of a hexafluoropropylene unit, a fluoroalkylethylene unit, a perfluoro(alkyl vinyl ether) unit, and an ethylene unit.

Preferably, the fluororesin is at least one selected from the group consisting of a tetrafluoroethylene/perfluoro(alkyl vinyl ether) copolymer and a tetrafluoroethylene/hexafluoropropylene copolymer.

Preferably, the fluororesin is a fluororesin subjected to fluorination treatment.

The present disclosure also provides a tube made of the molding material described above.

Effects of Invention

The present disclosure can provide a molding material containing a fluororesin with a reduced amount of metal components.

BRIEF DESCRIPTION OF DRAWINGS

FIG. 1 is a graph showing the amounts of metal eluted and the metal contents of pellets and tubes of Example 1 and Comparative Examples 1 to 3.

DESCRIPTION OF EMBODIMENTS

Specific embodiments of the present disclosure will now be described in detail, but the present disclosure is not limited to the embodiments below.

The molding material of the present disclosure has a metal content of 100 ng/1 g or less as measured by an ashing method.

In the present disclosure, the metal content of the molding material is measured by an ashing method. As the method for measuring a metal content used in the present disclosure, there can be used, for example, a method including ashing a molding material in a cuvette in an atomization unit of an atomic absorption photometer and measuring the metal content using the atomic absorption photometer, or another method including weighing a molding material in a platinum crucible, ashing it using a gas burner or an electric furnace, dissolving the ash in an acid, and measuring the metal content using an ICP optical emission spectrometer or a flameless atomic absorption photometer.

Accordingly, the metal content in the present disclosure includes the amount of metal components that are present on the surface of the molding material as well as the amount of metal components that are contained in the inner part of the molding material.

In Patent Document 1, a metal content is measured by a method for analyzing an amount of metal eluted, the method that involving use of a molding material in the form of a pellet and quantitative analysis of the amount of the metal eluted from that molding material into a nitric acid aqueous solution. In such a conventional method for measuring a metal content, only the amount of the metal components present on the surface of the pellet is to be measured. Accordingly, even if any metal components eluted from a given molding material is not detected by this method for analyzing an amount of metal eluted, a possible adverse influence of metal components contained in the inner part of the molding material cannot be completely eliminated. With the fine line thickness in a semiconductor device of late years, measures against metal contamination, which causes a failure in performance characteristics of a transistor element, are needed at an atomic level, and also, regarding to purity of a material that contacts a chemical liquid, higher purity is needed for improvement in the yield of the device. For example, the length of a chemical liquid line put in a manufacturing plant of semiconductor devices or the like extends over hundreds or thousands of meters, and the area of the inside thereof contacting a chemical liquid is extremely large. On the surface that is to contact a chemical liquid and its vicinity within a depth of nanometers or micrometers, there are fine pores of a molecular size which molecules of a chemical liquid can enter, and regarding to even a minute amount of metal components contained in the inner part of the molding material, metals that are contained in the inner part of the resin and are not detected by the method for analyzing an amount of metal eluted during a short time may thus be eluted over a long time. The influence of that is not negligible.

The metal content of the molding material of the present disclosure is 100 ng/1 g or less, preferably 60 ng/1 g or less, more preferably 50 ng/1 g or less, particularly preferably 40 ng/1 g or less, most preferably 30 ng/1 g or less, and may be 1 ng/1 g or more but the lower limit is not particularly limited. When the metal content is within the range described above, any adverse influence of metal components released from a molded article obtained from the molding material can be avoided even if the molded article is used in a severe environment.

The metal content in the present disclosure refers to a total metal content of Fe, Cr, Ni, Cu, Al, Na, Mg and K.

The molding material of the present disclosure comprises a fluororesin.

In the present disclosure, the fluororesin is a partly crystalline fluoropolymer, and is not a fluoroelastomer but a fluoroplastic. The fluororesin has a melting point and has thermoplasticity.

The fluororesin contained in the molding material of the present disclosure is melt-fabricable. In the present disclosure, the term "melt-fabricable" means that the polymer can be melted and fabricated using a conventional processing device such as an extruder or an injection molding machine.

Examples of the fluororesin contained in the molding material of the present disclosure include a fluororesin containing a fluoromonomer unit and a fluororesin containing a fluoromonomer unit and a fluorine-free monomer unit.

The fluoromonomer is preferably at least one selected from the group consisting of tetrafluoroethylene [TFE], hexafluoropropylene [HFP], chlorotrifluoroethylene [CTFE], vinyl fluoride [VF], vinylidene fluoride [VDF], trifluoroethylene, hexafluoroisobutylene, fluoroalkyl ethylene represented by $CH_2=CZ^1(CF_2)_nZ^2$ wherein $Z^1$ is H or F, $Z^2$ is H, F, or Cl, n is an integer of 1 to 10, perfluoro(alkyl vinyl ether) [PAVE] represented by $CF_2=CF-O-Rf^6$ wherein $Rf^6$ represents a perfluoroalkyl group having 1 to 8 carbon atoms, akyl perfluoro vinyl ether derivative represented by $CF_2=CF-O-CH_2-Rf^7$ wherein $Rf^7$ is a perfluoroalkyl group having 1 to 5 carbon atoms, perfluoro-2,2-dimethyl-1,3-dioxole [PDD], and perfluoro-2-methylene-4-methyl-1,3-dioxolane [PMD].

Examples of the fluoroalkyl ethylene represented by $CH_2=CZ^1(CF_2)_nZ^2$ include $CH_2=CFCF_3$, $CH_2=CH-C_4F_9$, $CH_2=CH-C_6F_{13}$, and $CH_2=CF-C_3F_6H$.

Examples of the perfluoro(alkyl vinyl ether) represented by $CF_2=CF-O-Rf^6$ include $CF_2=CF-OCF_3$, $CF_2=CF-OCF_2CF_3$ and $CF_2=CF-OCF_2CF_2CF_3$.

Examples of the fluorine-free monomer include a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butyl-benzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropioate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may be a hydrocarbon monomer having a functional group. Examples of the hydrocarbon monomer having a functional group include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; a fluorine-free monomer having a glycidyl group such as glycidyl vinyl ether and glycidyl allyl ether; a fluorine-free monomer having an amino group such as aminoalkyl vinyl ether and aminoalkyl allyl ether; a fluorine-free monomer having an amide group such as (meth)acrylamide and methylol acrylamide; a bromine-containing olefin, an iodine-containing olefin, a bromine-containing vinyl ether, and an iodine-containing vinyl ether; and a fluorine-free monomer having a nitrile group.

Examples of a suitable combination of units selected from the fluoromonomer unit and the fluorine-free monomer unit include a combination of a tetrafluoroethylene unit and at least one monomer unit selected from the group consisting of a hexafluoropropylene unit, a fluoroalkylethylene unit, a perfluoro(alkyl vinyl ether) unit, and an ethylene unit.

More specifically, the fluororesin is preferably at least one fluororesin selected from the group consisting of TFE/PAVE copolymer [PFA], TFE/HFP copolymer [FEP], ethylene [Et]/TFE copolymer [ETFE], Et/TFE/HFP copolymer, polychlorotrifluoroethylene [PCTFE], CTFE/TFE copolymer, Et/CTFE copolymer, PVDF, VDF/TFE copolymer, and PVF. The fluororesin is more preferably at least one selected from the group consisting of PFA, FEP, ETFE and Et/TFE/HFP copolymer, and even more preferably at least one perfluororesin selected from the group consisting of PFA and FEP.

Since the fluororesin is melt-fabricable, the melt flow rate (MFR) thereof can be measured by the measurement method that will be described later. The MFR of the fluororesin is preferably 1 to 6 g/10 min, more preferably 1 to 5 g/10 min, and particularly preferably 2 to 5 g/10 min. When the MFR is within the range described above, the molded article obtained using the molding material of the present disclosure exhibits excellent effects characteristic to the fluororesin and also has the excellent mechanical property. For example, when a tube is prepared using the molding material of the present disclosure having a MFR within the above-described range by extrusion molding, the molten material extruded from the die has a high viscosity, and therefore can enter a sizing die and be cooled while keeping a uniform thickness without causing a sag in an air gap before the molten material enters the sizing die, even if the tube diameter is large. In short, even in the case where a tube having a tube size of more than one inch in terms of a diameter, the molding material of the present disclosure exhibits good stability in molding. In addition, in the case where a molded tube is flared or connected to a mechanical joint, a sleeve may be driven into the inside of the tube to expand and the tube may be pressed with a nut when use; however, because a stress concentrates at the flare of the tube at that time, a stress crack is developed in the neck, which is problematic. When the MFR is within the above-described range, the molding material of the present disclosure has strong resistance to stress cracks, and thus a stress crack is less likely to be developed in a tube made of the molding material of the present disclosure.

In the present disclosure, the MFR is a value (g/10 min) obtained as the mass of the polymer flowed out from a nozzle with an inner diameter of 2 mm and a length of 8 mm for 10 minutes at a predetermined measuring temperature and load according to the kind of the fluoropolymer (for example, 372° C. for PFA and FEP, 279° C. for ETFE, and 5 kg for PFA, FEP, and ETFE) using a melt indexer (manufactured by YASUDA SEIKI SEISAKUSHO, LTD.) in accordance with ASTM D1238.

The melting point of the fluororesin is preferably 190 to 324° C., more preferably 200° C. or more, even more preferably 220° C. or more, and particularly preferably 280° C. or more, and more preferably 322° C. or less. The melting point is a temperature corresponding to the maximum value in the heat-of-fusion curve as determined using a differential scanning calorimeter [DSC] at a rate of a temperature rise of 10° C./min.

The PFA is preferably, but not limited to, a copolymer having a molar ratio between the TFE unit and the PAVE unit, TFE unit/PAVE unit, of 70/30 or more and 99/1 or less. A more preferable molar ratio is 70/30 or more and 98.9/1.1 or less, and an even more preferable molar ratio is 80/20 or more and 98.9/1.1 or less. If the amount of the TFE unit is too small, the mechanical property tends to be poor, and if the amount of the TFE unit is too large, the melting point tends to be too high, resulting in poor moldability. Also, the PFA is preferably a copolymer containing 0.1 to 10 mol % of a monomer unit derived from a monomer copolymerizable with the TFE and the PAVE and 90 to 99.9 mol % of the TFE unit and the PAVE unit in total. Examples of the monomer copolymerizable with the TFE and the PAVE include HFP, a vinyl monomer represented by $CZ^3Z^4=CZ^5(CF_2)_nZ^6$ wherein $Z^3$, $Z^4$, and $Z^5$ are the same or different and represent H or F, $Z^6$ represents H, F, or Cl, and n represents an integer of to 10, and an alkyl perfluorovinyl ether derivative represented by $CF_2=CF-OCH_2-Rf^7$ wherein $Rf^7$ represents a perfluoroalkyl group having 1 to 5 carbon atoms.

The melting point of the PFA is preferably 180 to 342° C., more preferably 230 to 320° C., and even more preferably 280 to 320° C.

The PFA preferably has a melt flow rate (MFR) of 1 to 6 g/10 min, more preferably 1 to 5 g/10 min, and particularly preferably 2 to 5 g/10 min, as measured at 372° C.

The PFA preferably has an initial pyrolysis temperature of 380° C. or more. The initial pyrolysis temperature is more preferably 400° C. or more, and even more preferably 410° C. or more.

The FEP is preferably, but not limited to, a copolymer having a molar ratio of the TFE unit and the HFP unit, TFE unit/HFP unit, of 70/30 or more and 99/1 or less. A more preferable molar ratio is 70/30 or more and 98.9/1.1 or less, and an even more preferable molar ratio is 80/20 or more and 98.9/1.1 or less. If the amount of the TFE unit is too small, the mechanical property tends to be poor, and if the amount of the TFE unit is too large, the melting point tends to be too high, resulting in poor moldability. Also, the FEP is preferably a copolymer containing 0.1 to 10 mol % of a monomer unit derived from a monomer copolymerizable with the TFE and the HFP and 90 to 99.9 mol % of the TFE unit and the HFP unit in total. Examples of the monomer copolymerizable with the TFE and the HFP include PAVE, and an alkyl perfluorovinyl ether derivative.

The melting point of the FEP is preferably 150 to 324° C., more preferably 200 to 320° C., and even more preferably 240 to 320° C.

The FEP preferably has a melt flow rate (MFR) of 1 to 6 g/10 min, more preferably 1 to 5 g/10 min, and particularly preferably 2 to 5 g/10 min, as measured at 372° C.

The FEP preferably has an initial pyrolysis temperature of 360° C. or more. The initial pyrolysis temperature is more preferably 380° C. or more, and more preferably 390° C. or more.

The ETFE is preferably a copolymer having a molar ratio of the TFE unit and the ethylene unit, TFE unit/ethylene unit, of 20/80 or more and 90/10 or less. A more preferable molar ratio is 37/63 or more and 85/15 or less, and an even more preferable molar ratio is 38/62 or more and 80/20 or less. The ETFE may be a copolymer composed of TFE, ethylene, and a monomer copolymerizable with TFE and ethylene. Examples of the copolymerizable monomer include monomers represented by the formulae $CH_2=CX^5Rf^3$, $CF_2=CFRf^3$, $CF_2=CFORf^3$, and $CH_2=C(Rf^3)_2$ wherein $X^5$ represents H or F, and $Rf^3$ represents a fluoroalkyl group optionally including an ether bond. Among these, fluorine-containing vinyl monomers represented by $CF_2=CFRf^3$, $CF_2=CFORf^3$, and $CH_2=CX^5Rf^3$ are preferable, and HFP, perfluoro(alkyl vinyl ether) represented by $CF_2=CF-ORf^4$ wherein $Rf^4$ represents a perfluoroalkyl group having to 5 carbon atoms, and a fluorine-containing vinyl monomer represented by $CH_2=CX^5Rf^3$ wherein $Rf^3$ is a fluoroalkyl group having 1 to 8 carbon atoms are more preferable. The monomer copolymerizable with TFE and ethylene also may be an aliphatic unsaturated carboxylic acid such as itaconic acid and itaconic anhydride. The ETFE preferably contains a monomer unit copolymerizable with TFE and ethylene in an amount of 0.1 to 10 mol %, more preferably 0.1 to 5 mol %, and particularly preferably 0.2 to 4 mol %.

The melting point of the ETFE is preferably 140 to 324° C. or less, more preferably 160 to 320° C., and even more preferably 195 to 320° C.

The ETFE preferably has a melt flow rate (MFR) of 1 to 6 g/10 min, more preferably 1 to 5 g/10 min, and particularly preferably 2 to 5 g/10 min, as measured at 297° C.

The ETFE preferably has an initial pyrolysis temperature of 330° C. or more. The initial pyrolysis temperature is more preferably 340° C. or more, and even more preferably 350° C. or more.

The fluororesin may have a terminal group, such as $-CF_3$ and $-CF_2H$, in at least one moiety of the polymer main chain and the polymer side chain, and is preferably, but not limited to, a fluororesin subjected to fluorination treatment. A fluororesin not subjected to fluorination treatment may have a thermally and electrically unstable terminal group, such as $-COOH$, $-COOCH_3$, $-CH_2OH$, $-COF$, and $-CONH_2$ (hereinafter, such a terminal group is also referred to as an "unstable terminal group"). These unstable terminal groups can be decreased by the fluorination treatment.

The fluororesin preferably includes a small number of the unstable terminal groups or no unstable terminal groups, and the total number of the unstable terminal groups is preferably 120 or less per $1 \times 10^6$ carbon atoms. According to the present disclosure, even if the molding material contains a fluororesin obtained by fluorination treatment to satisfy the above-described range of the total number of the unstable terminal groups, the metal content can be within the above-described range.

In the fluororesin, the total number of the above-described five unstable terminal groups and the terminal group $-CF_2H$, i.e., the total number of $-COOH$, $-COOCH_3$, $-CH_2OH$, $-COF$, $-CONH_2$, and $-CF_2H$, is more preferably 120 or less per 1×10$^6$ carbon atoms, in view of preventing a failure in mold resulting from foaming during molding. If the total number is more than 120, a failure in mold may occur. The number of the unstable terminal groups is more preferably 50 or less, even more preferably 20 or less, and most preferably 10 or less. In the present disclosure, the number of the unstable terminal groups is a value obtained from infrared absorption spectrometry. All may be terminal groups —CF$_3$ with no unstable terminal groups or the terminal group —CF$_2$H.

The fluorination treatment can be performed by contacting a fluororesin that has not been subjected to fluorination treatment with a fluorine-containing compound.

Examples of the fluorine-containing compound include, but not limited to, a fluorine radical source that generate a fluorine radical under the conditions of the fluorination treatment. Examples of the fluorine radical source include F$_2$ gas, CoF$_3$, AgF$_2$, UF$_6$, OF$_2$, N$_2$F$_2$, CF$_3$OF, and a fluorohalogen (e.g., IF$_5$ and ClF$_3$).

The fluorine radical source, such as F$_2$ gas, may have a concentration of 100%, but is preferably diluted before use to 5 to 50 mass %, and even more preferably 15 to 30 mass % by mixing with an inert gas in terms of safety. Examples of the inert gas include nitrogen gas, helium gas, and argon gas, and nitrogen gas is preferable from an economical viewpoint.

The condition for the fluorination treatment is not limited. For example, a fluororesin in a melting state may be contacted with a fluorine-containing compound, and the contact can be performed usually at the melting point of the fluororesin or a lower temperature, preferably 20 to 220° C., and more preferably 100 to 200° C. The fluorination treatment is performed generally for 1 to 30 hours, and preferably 5 to 25 hours. The fluorination treatment is preferably performed by contacting a fluororesin that has not been subjected to fluorination treatment with a fluorine gas (F$_2$ gas).

The molding material may include other components, if needed. Examples of the other components include additives such as a cross-linking agent, an antistatic agent, a heat stabilizer, a foaming agent, a foam nucleating agent, an antioxidant, a surfactant, a photopolymerization initiator, an anti-wear agent, and a surface modifier. It is a matter of course in the context of the object of the present disclosure that the metal content of the molding material should be within the range described hereinabove even if these other components are included therein.

The form of the molding material of the present disclosure is not limited and may be a powder or a pellet.

The moisture content of the molding material is preferably 1 mass % or less, more preferably 0.1 mass % or less, and even more preferably 0.01 mass % or less. According the present disclosure, even if the molding material is obtained by drying so as to satisfy the above described range of the moisture content, the metal content thereof can be within the range described hereinbefore.

In order to produce the molding material of the present disclosure, it is necessary that materials used for the production and the fluororesin are kept from contacting metallic surfaces of equipment and piping as much as possible in all steps in the production of the molding material including the polymerization step, the granulation step, the washing step, the drying step, the transferring step, and the storage step, the pelletizing step, the fluorination step, and the product-packing step, and it is also necessary to use materials with low metal contents as materials used for the production.

The molding material of the present disclosure can be produced by using dried clean air as air used for drying the fluororesin and air used for transferring the fluororesin from equipment to other equipment. Thus, the present disclosure relates to a method for producing the above-described molding material, the method involving use of dried clean air.

Patent Document 1 discloses a method for obtaining a molding material with a smaller content of metal components, the method including performing polymerization using starting materials with smaller contents of specific metal components to produce a fluorine-containing copolymer and processing the fluorine-containing copolymer into a molding material while keeping the copolymer from contacting any metallic surface of production equipment as much as possible. However, merely using such a conventional method cannot give the metal content of the molding material of the present disclosure. It is necessary for producing the molding material of the present disclosure to control the quality of the air for drying and transferring the fluororesin, in addition to using a conventional method for producing a molding material having a low metal content.

In production of a molding material including a fluororesin, a wet polymerization product is obtained after polymerization. The polymerization product can be made into a pellet through a plurality of steps. In this case, a large amount of air is blown in many steps, among the steps for producing the pellet including the washing step, the drying step, the transferring step, the storing step, the pelletizing step, the fluorination step, and the product-packing step. Particularly, a powder or a pellet is often transferred from equipment to other equipment using a compressed air in view of productivity. Thus, a large amount of air is used in the production process of a molding material including a fluororesin.

Usually, air includes particulate contaminants including metal components. Even when a filter is used for removing particulate pollutants, a filter with a large opening size has been conventionally used. In the production method of the present disclosure, clean air is used, whereby contamination with metal components can be prevented to obtain a molding material with a low metal content. The reason why the quality of the air for use in the production process of a fluororesin is not clear but is surmised as follows. A powder or a pellet of a fluororesin has a much larger surface area than a crumb or a compound of a fluorine-containing elastomer. Furthermore, in the production processes of a fluororesin, the weight of a semi-product and product to be produced amounts to several tons, and the amount of air used in its production steps is much larger than in the production process of a fluorine-containing elastomer. Accordingly, the amount of air contacting a unit surface area of a powder or a pellet is outstandingly large, and thus, it is surmised that the quality of the air has a large influence on the metal content of a molding material including a fluororesin that is finally obtained.

In the production method of the present disclosure, it is preferred to use air that has passed through a HEPA filter having a collection efficiency of 99.97% or more for particles of 300 nm. The filter for allowing air to pass through is preferably a ULPA filter having a collection efficiency of 99.999% or more for particles of 150 nm, and more preferably a ULPA filter that is of, for example, electrostatically collecting type and exhibits the effect of collecting particles of 100 nm. Although a finer filter exhibits the higher collecting effect, it is preferable to use a filter having a collection efficiency of 99.97% or more for particles of 10 nm, in view of the relationship between electric power saving and running cost.

Air also includes moisture. The moisture in air has not been controlled heretofore. The present inventors have payed attention to the moisture content of air, which has not been controlled heretofore, and found that the moisture content influences the metal content of the molding material. The reason for this is not clear but is surmised as follows.

As described in Patent Document 1, a method is known in which metallic surfaces of equipment and piping are coated with a fluororesin to keep materials used for the production and a fluororesin from contacting metallic surfaces of equipment and piping as much as possible. However, parts with which materials used for the production and the fluororesin do not contact are not coated with a fluororesin, and the metallic surfaces thereof are thus exposed. Further, among the parts which materials used for the production and the fluororesin do not contact, some parts are technically difficult to be coated with a fluororesin. For these reasons, not a few parts having a metallic surface exposed are present in equipment and piping. They are, for example, a flange, a manhole cover, an inspection hatch, a top plate of a tank, branched piping including piping with a small diameter for evacuating a tank, a flange, and a bolt.

In the production process, a trace amount of hydrogen fluoride is generated from the fluororesin or the like. The generated hydrogen fluoride reacts with moisture in air to produce hydrofluoric acid. Air containing hydrofluoric acid easily enters even spaces which the materials used for production and the fluororesin do not enter, and corrodes a metallic surface to generate a source of a metal component. It is surmised that the metal component generated from the source contaminates the materials used for production and the fluororesin.

However, it is extremely difficult to coat all metallic surfaces with glass or a fluororesin, not only for economic reasons but also for technical reasons. In the production method of the present disclosure, dried air is used. The use of dried air can suppress the production of hydrofluoric acid to thereby prevent the generation of a source of a metal component on the equipment and piping for use in the production process of the molding material, and thus, a molding material with a low metal content can be obtained.

The dew point of the air used in the production method of the present disclosure is preferably −10° C. or less, and more preferably −20° C. or less, even more preferably −50° C. or less, and particularly preferably −70° C. or less. Although a lower dew point is preferable, it may be −100° C. or more in view of the cost. The dew point can be measured at atmospheric pressure with a usual dew point hydrometer such as a dew point hydrometer of a capacitance system having a measurable temperature range from −100 to 20° C.

Particularly, even when a molding material is subjected to fluorination treatment with a fluorine gas, the use of dried air prevents corrosion of the equipment, piping and the like for use in the fluorination step and the steps following the fluorination step, and thus a molding material with a low metal content can be obtained.

The method for producing dried air may be a conventional known method, and example thereof include a method involving drying air by compressing and cooling air using a compressor, a method involving drying air using an adsorbent such as silica gel, and a method involving use of these methods in combination. It is also preferable to remove an oil or solid particulates included in air using an oil mist filter, a HEPA filter, or the like when producing dried air.

In the method for producing a molding material of the present disclosure, materials with low metal contents may be used as materials used for the production, as described above. The materials used for the production include materials to be usually used for polymerization, including a monomer, a medium for polymerization, a polymerization initiator, a chain transfer agent, and a surfactant, and a medium for use in washing the polymer. The metal content of these materials is preferably 10 ppb or less, and more preferably 5 ppb or less, in terms of the total metal content of Fe, Cr, Ni, Cu, Al, Na, Mg, and K.

In the method for producing a molding material of the present disclosure, a method may be used in which materials used for the production and the fluororesin are kept from contacting metallic surfaces of equipment and piping as much as possible, as described hereinbefore. Specifically, a method may be used which includes lining metallic surfaces of equipment and piping with a fluororesin such as PFA, FEP, or ETFE, glass, or enamel, and the like. A method including lining metallic surfaces with a high-purity fluororesin such as high-purity PFA or high-purity PTFE is particularly preferable. Washing a surface formed by lining with an acidic chemical liquid is also effective in view of obtaining a molding material with a low metal content.

In the case of the molding material of the present disclosure in the form of a pellet, the fluororesin obtained by polymerization is molded into a pellet. Usually, an extruder is used for molding, and a high nickel alloy having corrosion resistance is used for a screw, a cylinder, and others of the extruder. It is technically difficult to line a screw, a cylinder, and others, and also, use of an alternative material to the high nickel alloy having corrosion resistance is not practical. On the other hand, according to the present disclosure, even when using such an extruder, a molding material having a metal content within the range described above can be produced. In other words, it is a preferable embodiment that the molding material of the present disclosure is a pellet.

The fluororesin included in the molding material of the present disclosure can be produced by bulk polymerization, solution polymerization, emulsion polymerization, suspension polymerization, or the like; however, suspension polymerization, which does not necessarily need use of a surfactant, a coagulant, or the like as a material used for polymerization, and easily controls the metal content, is preferable.

An embodiment of the method for producing the molding material of the present disclosure may be a production method including: the step of performing suspension polymerization of a fluoromonomer in pure water to thereby obtain a suspension containing a fluororesin; the step of collecting a wet powder from the suspension; the step of washing the collected wet powder with pure water; and the step of drying the washed wet powder to thereby obtain a dry powder. The production method of this embodiment may further include the step of granulating the collected wet powder, may further include the step of molding the dry powder to thereby obtain a pellet, and may include the step of subjecting the dry powder or the pellet to fluorination treatment. The powder or pellet finally obtained may be packed in a desired bag or container in the packing step.

In the suspension polymerization described above, materials including a monomer, a medium for polymerization, and a polymerization initiator are used, and for all of them, those having a low metal content are used. In addition, a tank on which a fluororesin, glass, or the like is lined is used as a polymerization tank so that materials used for the production and a fluororesin are kept from contacting metallic surfaces of the polymerization tank. The lined inner surface of the polymerization tank may be washed with an acidic chemical liquid.

In the production method of this embodiment, clear and dried air is used for drying the wet powder. In the production method of this embodiment, clear and dried air is also used for transferring the dry powder or pellet from equipment to other equipment. A molding material having a metal content within the range described hereinbefore can be obtained in the form of a powder or a pellet by thus using clear and dried air.

A molded article can be obtained by molding the above-described molding material. Examples of the method for molding the molding material include, but not limited to, melt molding, including known methods such as extrusion molding, injection molding, transfer molding, inflation molding, and compression molding. The molding method may be appropriately selected from these methods according to the shape of the molded article to be obtained.

The method for molding the molding material is preferably extrusion molding, compression molding, or injection molding, and more preferably extrusion molding. When using any of these molding methods, a molded article, such as a tube, a film, or a bottle, can be easily produced.

The shape of the molded article is not limited, and examples thereof include a pellet, a film, a sheet, a board, a rod, a block, a cylinder, a container, wire, and a tube. The molded article may also be a coating layer of cookware such as an inner pot of a rice cooker, a hotplate, and a frying pan, or a fluororesin-made coating forming a top coat layer of a fixing roller for an image formation device such as an electrographic or electrostatic recording copier and a laser printer. The fluororesin-made coating can be formed by applying a fluororesin coating material to a base material.

The above-described molded article is preferably a tube, a film, or a bottle. Tubes, films, and bottles are usually produced by extrusion molding, compression molding, or injection molding, and are often produced by extrusion molding among them. In an extruder for use in extrusion molding, parts that contact a molding material are made of a metallic material, and no technique for replacing them with a material other than metallic materials is known up to now. However, since the molding material of the present disclosure has an extremely small metal content, the influence of the extruder on metal contamination upon molding by the extruder may be negligible, and the metal content of the molded article to be obtained can be 100 ng/1 g or less. In addition, since the molding material of the present disclosure has a small MFR, a tube, a film, and a bottle having excellent mechanical properties can be obtained. A tube made of the molding material of the present disclosure may has an amount of iron components eluted of 5 ng/cm$^2$ or less as measured by the elution method, which will be described later.

The molding material can be applied to use including, but not limited to, a diaphragm part of a diaphragm pump, molded bellows, a coated wire product, a part of semiconductor, packing/seal, a thin tube for a copy roll, monofilament, a belt, a gasket, a part for optical lens, a tube for oil drilling, a tube for geothermal power generation, wire for oil drilling, wire for a satellite, wire for nuclear power, wire for aircraft, a film for a solar panel, a gasket for a secondary battery and an electric double layer capacitor, and an OA roll.

The molding material can be used particularly suitably for, for example, a tube for flowing a gas or a chemical, a bottle for storing a chemical, a gas bag, a bag for a chemical liquid, a container for a chemical liquid, and a bag for frozen storage.

The molding material can be used particularly suitably for, for example, a body or a part of an opening valve, which raises concern of generation of particles such as a abrasion powder due to abrasion upon use; a sleeve for use in connecting a joint and a tube; a screw cap of a bottle or a container for a chemical liquid; a gear, a screw, a frying pan, a pot, a rice cooker, and a product having a substrate, such as metal, coated with a fluororesin; and a release film.

Embodiments have been described hereinabove, but it is understood that various change can be made on the embodiments and details without departing from the spirit and the scope of the claims.

EXAMPLES

Next, embodiments of the present disclosure will be described by way of Examples, but the present disclosure is no way limited thereto.

<Metal Content>

An ashing analysis of a molding material was performed by the ashing method described in WO94/28394. Specifically, a sample was weighed out in an amount within a range of 2 to 6 mg from the pellet obtained in Example or Comparative Example. The sample was heated at 1100° C. for 180 seconds in a graphite cuvette to ash it, and the resulting ash was analyzed with an atomic absorption spectrophotometer (polarized Zeeman atomic absorption spectrophotometer (Z-8100) manufactured by Hitachi, Ltd.).

In Examples, the above-described ashing analysis method was used, but another ashing analysis method different from this may be used, if needed. For example, the following method can be used. Specifically, 1 g of a sample is weighed out and put in a platinum crucible (platinum purity 99.9%). The sample is ashed using a gas burner or ashed in an electric furnace at 500° C. for 30 minutes, and then the ash remaining in the platinum crucible is dissolved in 35% hydrochloric acid to obtain a solution. The metal content of the resulting solution is measured with an ICP atomic emission spectrophotometer (SPS300 manufactured by Seiko Instruments Inc.) or a flameless atomic absorption spectrometer.

Example 1

A glass-lined autoclave was provided as a polymerization tank. Another glass-lined washing tank was used as a washing tank. Equipment lined with PFA were used as the other equipment that were to contact starting materials and a fluororesin, including a storage tank and piping.

As all materials used for polymerization, materials with low metal contents were used. As pure water used for polymerization and washing, pure water was used which had a Fe content of 2 ppb or less and a content of other metals of 1 ppb or less.

To the autoclave having a volume of 174 L, 34 L of pure water was added, followed by sufficient nitrogen purge. 30.4 kg of perfluorocyclobutane, 0.95 kg of perfluoro(propyl vinyl ether) ($CF_2$=$CFOCF_2CF_2CF_3$) [PPVE], and 0.6 kg of methanol were added thereto, and the system was kept at a temperature of 35° C. and an agitating speed of 200 rpm. Next, tetrafluoroethylene [TFE] was injected to 0.6 MPaG. 0.060 kg of di-sec-butyl peroxydicarbonate [SBP] was then added, and polymerization was started. As the pressure in the system decreased with the progress of the polymerization, TFE was continuously fed to keep a constant pressure, and PPVE was added in an amount of 0.065 kg every one hour. Thus, the polymerization was continued for 17 hours.

Unreacted monomers were released to return the pressure in the autoclave to atmospheric pressure, and the reaction product including TFE/PPVE copolymer [PFA] was collected.

The obtained reaction product was transferred from the autoclave to a washing tank through piping. In the washing tank to which the reaction product was placed, the reaction product was washed five times with 35 L of pure water. Then the washed reaction product was dehydrated to obtain a wet powder.

The obtained wet powder was placed in a container lined with a PFA sheet, and the container was left to stand in an oven heated at 150° C. Air that had passed through an air dryer and a HEPA filter (collection efficiency of 99.97% or more for particles of 300 nm) (dried air having a dew point of −10° C.) was fed while exhausting air, to carry out drying. The powder was dried at an air flow rate of 0.01 m³/min for 180 minutes to thereby obtain a dry powder.

The physical properties of the PFA were measured using the obtained dry powder. Specifically, the melt flow rate (MFR) of the obtained PFA was measured in accordance with ASTM D1238 (ASTM D3307) using a melt indexer (manufactured by Toyo Seiki Seisaku-sho, Ltd.) and found to be 3 g/10 min. The melting point of the obtained PFA was determined from the maximum value in the heat-of-fusion curve when the temperature was increased at a rate of 10° C./min using a differential scanning calorimeter [DSC] (product name: RDC220, manufactured by Seiko Instruments Inc.), and found to be 300° C. The monomer contents (molar ratio) of the obtained PFA was TFE/PPVE=98.4/1.6.

The obtained dry powder was molded into a pellet using an extruder in a clean room. The metal content of the obtained pellet was measured by the method described hereinbefore. The result is shown in Table 1.

Example 2

A dry powder was obtained in the same manner as in Example 1, except that a PFA-lined polymerization tank and a PFA-lined washing tank were used instead of a glass-lined polymerization tank and a glass-lined washing tank. The physical properties of the PFA were measured using the obtained dry powder, and it was found that the dry powder was a PFA having physical properties similar to those in Example 1.

The obtained dry powder was transferred from a hot air drying furnace to a PFA-lined storage tank for powder through PFA-lined piping using air which had passed through an air dryer and a HEPA filter (collection efficiency: 99.97% or more for particles of 300 nm) (dried air having a dew point of −10° C.). Then, the dry powder was dropped from the storage tank for powder to a PFA-lined hopper of an extruder in a clean room, and placed in a cylinder of the extruder in sequence to mold into a pellet. The metal content of the obtained pellet was measured by the method described hereinbefore. The result is shown in Table 1.

Example 3

A pellet was obtained and evaluated in the same manner as in Example 2, except that air which had passed through an air dryer and a ULPA filter (collection efficiency of 99.999% or more for particles of 150 nm) (dried air having a dew point of −15° C.) was used as air for hot air drying and transfer. The result is shown in Table 1.

Example 4

A pellet was obtained and evaluated in the same manner as in Example 2, except that air which had passed through an air dryer and a ULPA filter (collection efficiency of 99.999% or more for particles of 100 nm) (dried air having a dew point of −15° C.) was used as air for hot air drying and transfer. The result is shown in Table 1.

Comparative Example 1

A wet powder was obtained in the same manner as in Example 1, except that as the polymerization tank and the washing tank, a polymerization tank made of SUS 317 and a washing tank made of SUS 317 were used, and that as the other equipment that were to contact starting materials and a fluororesin, including a storage tank and piping, those made of SUS 317 were used. The obtained wet powder was dried in the same manner as in Example 1 to obtain a dry powder.

The physical properties of the PFA were measured using the obtained dry powder, and it was found that the dry powder was a PFA having physical properties similar to those in Example 1.

The obtained dry powder was molded into a pellet using an extruder in a clean room. The metal content of the obtained pellet was measured by the method described hereinbefore. The result is shown in Table 1.

Comparative Example 2

A dry powder and a pellet were obtained and evaluated in the same manner as in Comparative Example 1, except that the material of SUS was changed to SUS 316 from SUS 317. The result is shown in Table 1.

TABLE 1

| | Results of Analysis for Metals (Ashing Method (ng/1 g)) | | | | | | | |
|---|---|---|---|---|---|---|---|---|
| | Fe | Cr | Ni | Cu | Al | Na | Mg | K |
| Example 1 | 14 | 12 | 10 | <1 | <1 | 2 | <1 | 1 |
| Example 2 | 12 | 10 | 7 | <1 | <1 | <1 | <1 | <1 |
| Example 3 | 8 | 10 | 7 | <1 | <1 | <1 | <1 | <1 |
| Example 4 | 5 | 10 | 7 | <1 | <1 | <1 | <1 | <1 |
| Comparative Example 1 | 20 | 16 | 37 | 1 | —* | 17 | 6 | 4 |
| Comparative Example 2 | 52 | 21 | 57 | 2 | —* | 15 | 1 | 4 |

*— means "not determined"

Reference Example

The pellets obtained in Example 1, Comparative Example 1, and Comparative Example 2 were each immersed in 50 mass % hydrofluoric acid placed in a PFA-made container at 25° C. for 24 hours.

As the pellet of Comparative Example 3, there was provided a pellet that had the same composition as those obtained in Comparative Example 1 and Comparative Example but contained a relatively large amount of metal components, and the pellet was immersed in hydrofluoric acid in the same manner as above.

Simultaneously, hydrofluoric acid in which no pellet was immersed was also left to stand at 25° C. for 24 hours to prepare a reference aqueous solution.

For each of the obtained solutions, the iron concentration of the solution was measured using an ICP emission spectrometer (SPS300 manufactured by Seiko Instruments Inc.), and the amount of metal eluted, in terms of the amount of iron components eluted, was calculated by the following expression.

$$\text{Amount of metal eluted} = \left\{ \frac{\left(\begin{array}{c}\text{Metal concentration of}\\ \text{hydrofluoric acid in which}\\ \text{pellet was immersed}\end{array}\right) - \left(\begin{array}{c}\text{Metal concentration}\\ \text{of reference}\\ \text{aqueous solution}\end{array}\right)}{\text{Mass of pellet}} \right\} \times \text{Mass of hydrofluoric acid}$$

The pellets of Example 1 and Comparative Examples 1 to 3 were each molded using an extruder for tube under the conditions of molding for producing a commercial tube, to thereby obtain a tube having an outer diameter of 12 mm and a thickness of 1.0 mm, and the tube was then cut into a 40 cm length piece. In order to eliminate the influence of contaminants from air, which was the environment for molding, to thereby precisely compare the amount of metals eluted from a tube, the tube was washed with running pure water for 5 minutes in a clean booth. After draining off water, one end of the resulting tube was heat-sealed, and 50 mass % hydrofluoric acid was introduced to the tube, followed by heat-sealing the other end of the tube. The tube containing hydrofluoric acid was left to stand at 25° C. for 24 hours, and then, the solution including hydrofluoric acid was collected. The amount of iron components eluted from the tube was measured by the same method for measuring an amount of the metal eluted as described above, except that the resulting solution was used.

Compared were the amount ($ng/cm^2$) of iron components eluted from a tube as measured by the elution method, the amount (ng/1 g) of iron components eluted from a pellet as measured by the elution method, and the content (ng/1 g) of iron components in a pellet as measured by the ashing method. The results are shown in FIG. 1. (In FIG. 1, the vertical axis indicates the amount eluted or the content.)

As shown in FIG. 1, the amount of iron components eluted from the tube prepared from the pellet obtained in Example 1 was extremely small. It was seen from the results of Example 1 and Comparative Examples 1 to 3 that when using the molding material of the present disclosure, a molded article, such as a tube, which gives a smaller amount of metal eluted than a conventional molded article can be easily prepared by melt-molding. It was also seen that a tube made of the molding material of the present disclosure gives a smaller amount of metal eluted than a conventional tube.

As shown in FIG. 1, the value of the amount of iron components eluted from a tube is the smallest in Example 1, and the values in Comparative Examples 1 to 3 are in increasing order. On the other hand, the value of the amount of iron components eluted from a pellet is the largest in Comparative Example 2, and the value in Comparative Example 3 is smaller than that in Comparative Example 2. Thus, it can been seen that the amount of metal components eluted from a molded article (for example, a tube for a chemical liquid for use in a process for producing a semiconductor) obtained from a molding material cannot be estimated appropriately even if the amount of metal components eluted from a molding material is measured by the elution method.

The reason for this is probably because metal components that have been present in the inner part of the molding material appear on the surface or the vicinity of the surface when a molded article such as a tube is produced by melting and fabricating a molding material. As described above, the process for producing a molding material including fluororesin usually include a plurality of steps, and thus metal components may be present in the inner part of the molding material.

In contrast, the values of the content of iron components in the pellet measured by the ashing method in Comparative Examples 1 to 3 are in increasing order as shown in FIG. 1, which is the same tendency as the amounts of iron components eluted from a tube. In other words, it is understood that the amount of metal components eluted from a molded article obtained from a molding material can be appropriately grasped by measuring the content of metal components in the molding material by the ashing method.

Accordingly, a molded article, such as a tube, which gives an extremely small amount of metal components eluted, can be obtained by using the molding material of the present disclosure, which is specified by the metal content measured by the ashing method.

The invention claimed is:

1. A tube made of a molding material comprising a melt-fabricable fluororesin and the whole of the molding material having a metal content of 40 ng/1 g or less as measured by an ashing method,
    wherein the fluororesin is at least one selected from the group consisting of a tetrafluoroethylene/perfluoro(alkyl vinyl ether) copolymer and a tetrafluoroethylene/hexafluoropropylene copolymer,
    wherein the fluororesin has a melt flow rate of 1 to 6 g/10 min, and
    wherein the whole of the molding material has a Na content of <1 ng/1 g and a K content of <1 ng/1 g as measured by an ashing method.

2. The tube according to claim 1, wherein the molding material is a pellet.

3. The tube according to claim 1, wherein the fluororesin is a fluororesin subjected to fluorination treatment.

* * * * *